(12) United States Patent
Fein

(10) Patent No.: US 11,059,321 B1
(45) Date of Patent: Jul. 13, 2021

(54) GEOMETRIC ART STRUCTURE FOR FORMING THREE-DIMENSIONAL ARTWORK

(71) Applicant: Harvey Fein, Long Island City, NY (US)

(72) Inventor: Harvey Fein, Long Island City, NY (US)

( * ) Notice: Subject to any disclaimer, the term of this patent is extended or adjusted under 35 U.S.C. 154(b) by 0 days.

(21) Appl. No.: 17/143,362

(22) Filed: Jan. 7, 2021

(51) Int. Cl.
*G09B 19/10* (2006.01)
*B44F 99/00* (2013.01)
*B44B 11/00* (2006.01)

(52) U.S. Cl.
CPC ........... *B44F 99/00* (2013.01); *B44B 11/00* (2013.01); *G09B 19/10* (2013.01); *B44B 2700/12* (2013.01)

(58) Field of Classification Search
CPC ........ G09B 11/00; G09B 19/00; G09B 19/10; A63H 33/04; A63H 33/06
USPC ................................ 434/81, 82, 96; 446/117
See application file for complete search history.

(56) References Cited

U.S. PATENT DOCUMENTS

| | | | | |
|---|---|---|---|---|
| 1,656,341 A * | 1/1928 | Smith Peter F | .......... | G09F 1/08 40/539 |
| 3,641,701 A * | 2/1972 | Rosenfeld | .............. | A63H 33/06 446/111 |
| 4,991,813 A * | 2/1991 | Beaulieu | ............. | G09F 15/0068 248/174 |
| 5,000,717 A * | 3/1991 | Pfeiffer | .................. | A63H 33/04 248/174 |
| 5,112,264 A * | 5/1992 | Ning | ...................... | A63H 33/06 446/108 |
| 8,821,164 B2 * | 9/2014 | Valdez | ................... | A47K 10/42 434/81 |
| 10,204,530 B1 * | 2/2019 | Cramer | .................. | G09B 23/04 |
| 2008/0302792 A1 * | 12/2008 | Puckett | .................. | B44F 1/066 220/62.21 |
| 2009/0081918 A1 * | 3/2009 | Shen, Jr. | ................ | A63H 33/04 446/85 |

OTHER PUBLICATIONS

"Lewo Wooden Rainbow Stacker Nesting Puzzle Blocks Educational Toys for Kids Baby Toddlers", amazon.com [retrieved online May 25, 2021] (Year: 2019).*

* cited by examiner

*Primary Examiner* — Kurt Fernstrom
(74) *Attorney, Agent, or Firm* — Michael J. Feigin, Esq.; Feigin and Fridman LLC

(57) ABSTRACT

A geometric art structure includes a half cylinder, a first semi-circular panel, a second semi-circular panel, and a cover. The half cylinder includes a body defining a semi-circular wall having an interior surface, an exterior surface, a first end, a second end, a front end, a closed rear end, and an interior volume. The first end includes a first lateral face. The second end includes a second lateral face. The front end includes a pair of longitudinal faces. The front end includes an opening providing access to the interior volume. The first semi-circular panel is disposed at the first end and extends between the front end and the rear end. The second semi-circular panel is disposed at the second end and extends between the front end and the rear end. The cover extends over the body such that it terminates at the front end, leaving the opening exposed.

18 Claims, 7 Drawing Sheets

FIG. 3

GEOMETRIC ART STRUCTURE FOR FORMING THREE-DIMENSIONAL ARTWORK

FIELD OF THE DISCLOSED TECHNOLOGY

The disclosed technology relates generally to structures for creating artwork. More specifically, the present disclosed technology relates to a geometric art structure for forming three-dimensional artwork.

BACKGROUND

In the visual arts, shape is a flat, enclosed area of an artwork created through lines, textures, colors, or an area enclosed by other shapes such as triangles, circles, and squares. Likewise, form can refer to a three-dimensional composition or object within a three-dimensional composition. Form is one of the seven elements of art which are the visual tools that an artist uses to compose a work of art. In addition to form, the other elements include line, shape, value, color, texture, and space. As an element of art, form connotes something that is three-dimensional and encloses volume, having length, width, and height, versus shape, which is two-dimensional, or flat. A form is a shape in three dimensions, and, like shapes, can be geometric or organic.

Geometric shapes are precisely edged and mathematically consistent curves, they are pure forms and so consist of circles, squares, spirals, triangles, while geometric forms are simple volumes, such as cubes, cylinders and pyramids. They generally dominate architecture, technology, industry and crystalline structures.

Geometric forms are forms that are mathematical, precise, and can be named, as in the basic geometric forms: sphere, cube, pyramid, cone, and cylinder. A circle becomes a sphere in three dimensions, a square becomes a cube, a triangle becomes a pyramid or cone.

Geometric forms are most often found in architecture and the built environment, although you can also find them in the spheres of planets and bubbles, and in the crystalline pattern of snowflakes, for example.

Form is most closely tied to sculpture, since it is a three-dimensional art and has traditionally consisted almost primarily of form, with color and texture being subordinate. Three-dimensional forms can be seen from more than one side. Traditionally forms could be viewed from all sides, called sculpture in-the-round, or in relief, those in which the sculpted elements remain attached to a solid background, including bas-relief, haut-relief, and sunken-relief. Historically sculptures were made in the likeness of someone, to honor a hero or god.

The twentieth century broadened the meaning of sculpture, though, heralding the concept of open and closed forms, and the meaning continues to expand today. Sculptures are no longer only representational, static, stationery, forms with a solid opaque mass that has been carved out of stone or modeled out of bronze. Sculpture today may be abstract, assembled from different objects, kinetic, change with time, or made from unconventional materials like light or holograms, as in the work of renowned artist James Turrell.

Accordingly, there is a need for a geometric structure or form for use as a building block or component in forming or creating a larger 3-dimensional sculpture or work of art.

SUMMARY OF THE DISCLOSED TECHNOLOGY

Disclosed herein is a geometric art structure for forming three-dimensional artwork including a half cylinder, a first semi-circular panel, a second semi-circular panel, and a cover covering a portion of the half cylinder and the first semi-circular panel and the second semi-circular panel. The half cylinder includes a semi-circular body defining a semi-circular wall, an interior surface, an exterior surface opposite the interior surface, a first end, a second end opposite the first end, a front end, a closed rear end opposite the front end, and a hollowed semi-circular interior volume. The first end includes a first lateral face extending laterally from the front end to the rear end. The second end includes a second lateral face extending laterally from the front end to the rear end. The front end includes a pair of front longitudinal faces extending longitudinally from the first end to the second end and between the interior surface and exterior surface. The front end includes an opening providing access to the hollowed semi-circular interior volume. The first semi-circular panel is disposed at the first end and is flush with the first lateral face and the pair of front longitudinal faces. The first semi-circular panel extends between the front end and the rear end. The second semi-circular panel is disposed at the second end and is flush with the second lateral face and the pair of front longitudinal faces. The second semi-circular panel extends between the front end and the rear end and is opposite the first semi-circular panel. The cover extends tautly over the first end and the first semi-circular panel, the second end and the second semi-circular panel, and the rear end and the exterior surface.

In embodiments, the first lateral face, the second lateral face, and the pair of front longitudinal faces each include a planar surface.

In some embodiments, the pair of front longitudinal faces are coplanar with respect to each other.

In other embodiments, the first semi-circular panel includes an outer end including an outer planar surface, an inner end including an inner planar surface, the outer end opposite the inner end, a sidewall defining an arcuate planar face, and a front lateral face extending between the outer end and the inner end, the front lateral face including a front planar surface. The second semi-circular panel includes an outer end including an outer planar surface, an inner end including an inner planar surface, the outer end opposite the inner end, a sidewall defining an arcuate planar face, and a front lateral face extending between the outer end and the inner end, the front lateral face including a front planar surface.

In certain embodiments, the first semi-circular panel is positioned within the hollowed semi-circular interior volume such that the arcuate planar face of the sidewall is against the interior surface, the outer planar surface is flush with the planar surface of the first lateral face, and the front planar surface of the front lateral face is flush with the planar surfaces of the pair of longitudinally extending faces.

In some embodiments, the second semi-circular panel is positioned within the hollowed semi-circular interior volume such that the arcuate planar face of the sidewall of the second semi-circular panel is against the interior surface, the outer planar surface of the second semi-circular panel is flush with the planar surface of the second lateral face and the front planar surface of the front lateral face of the second semi-circular panel is flush with the planar surfaces of the pair of longitudinally extending faces.

In embodiments, the first lateral face and the second lateral face are perpendicular with respect to the pair of front longitudinal faces.

In some embodiments, the front lateral face of the first semi-circular panel, the front lateral face of the second semi-circular panel, and the pair of front longitudinal faces are coplanar with respect to one another.

In certain embodiments, the cover extends to the front lateral face of the first semi-circular panel, the front lateral face of the second semi-circular panel, and the pair of front longitudinal faces such that the cover is coplanar with each of the front lateral faces and the pair of front longitudinal faces.

In embodiments, the cover includes a first piece positioned over the first end and the first semi-circular panel, a second piece positioned over the second end and the second semi-circular panel, and a third piece positioned over the rear end and exterior surface of the semi-circular wall.

In other embodiments, the geometric art structure includes a first intermediary layer positioned between the first piece and the outer planar surface of the first semi-circular panel, and a second intermediary layer positioned between the second piece and the outer planar surface of the second semi-circular panel.

In some embodiments, the first lateral face includes a first sloping portion extending at an angle from the front end to the rear end such that the body is longer at the front end than at the rear end, the first sloping portion including a planar surface and the second lateral face includes a second sloping portion extending at an angle from the front end to the rear end such that the body is longer at the front end than at the rear end, the second sloping portion including a planar surface.

In certain embodiments, the first lateral face includes a first shoulder adjacent to the front end, the first shoulder having a planar surface, the first sloping portion extending vertically away from the rear end to the first shoulder, the first lateral face forming a ridge at the juncture between the first loping portion and the first shoulder.

In other embodiments, the second lateral face includes a second shoulder adjacent to the front end, the second shoulder having a planar surface, the sloping portion extending vertically away from the rear end to the second shoulder, the first lateral face forming a ridge at the juncture between the second sloping portion and the second shoulder.

In embodiments, the first sloping portion extends from the rear end at an obtuse angle with respect to the interior surface of the semi-circular wall and the second sloping portion extends from the rear end at an obtuse angle with respect to the interior surface of the semi-circular wall.

In some embodiments, the planar surfaces of the first shoulder and the planar surface of the second shoulder are orthogonal relative to the planar surfaces of the pair of front longitudinal faces, the planar surface of the first shoulder is disposed at an angle with respect to the first sloping portion, and the planar surface of the second shoulder is disposed at an angle with respect to the second sloping portion.

In certain embodiments, the first semi-circular panel includes a planar body including substantially the shape as the first lateral face, the planar body including a curved end and a flat end including a first lip protruding outwardly therefrom, the first lip protruding at an angle with respect to the planar body and the second semi-circular panel includes a planar body including substantially the shape as the second lateral face, the planar body including a curved end and a flat end including a second lip protruding outwardly therefrom, the second lip protruding at an angle with respect to the planar body.

In embodiments, the first semi-circular panel is positioned on the first end such that the planar body conforms to the contour formed by the first lateral face and is coextensive therewith and the second semi-circular panel is positioned on the second end such that the planar body of the second semi-circular panel conforms to the contour formed by the second lateral face and is coextensive therewith.

In embodiments, the cover extends over the semi-circular body ending at the front end, thereby leaving the opening of the front end exposed and leaving access to the hollowed semi-circular interior volume.

"Geometric" is defined as "using straight or curved lines in designs or outlines, and/or of or relating to art based on shapes." "Coextensive" is defined as "extending over the same space and/or corresponding substantially the same, or exactly, in extent." "Three-dimensional" also referred to as 3-dimensional or 3D herein, is defined as "having a length, a width, and a depth." "Semi-circle" is defined as "substantially half of a circle or its circumference." "Semi-circular" is defined as "forming or shaped like a semi-circle." "Structure" is defined as a "three-dimensional object or item arranged in a definite pattern of organization."

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

The disclosed technology provides a geometric art structure for forming a three-dimensional work of art including a half cylinder, a first semi-circular panel, a second semi-circular panel, and a cover. The geometric art structure may be attached to a wall or surface, such as a canvas, with various of the same or similar geometric art structures to form a larger geometric, three-dimensional work of art.

Figure 1:
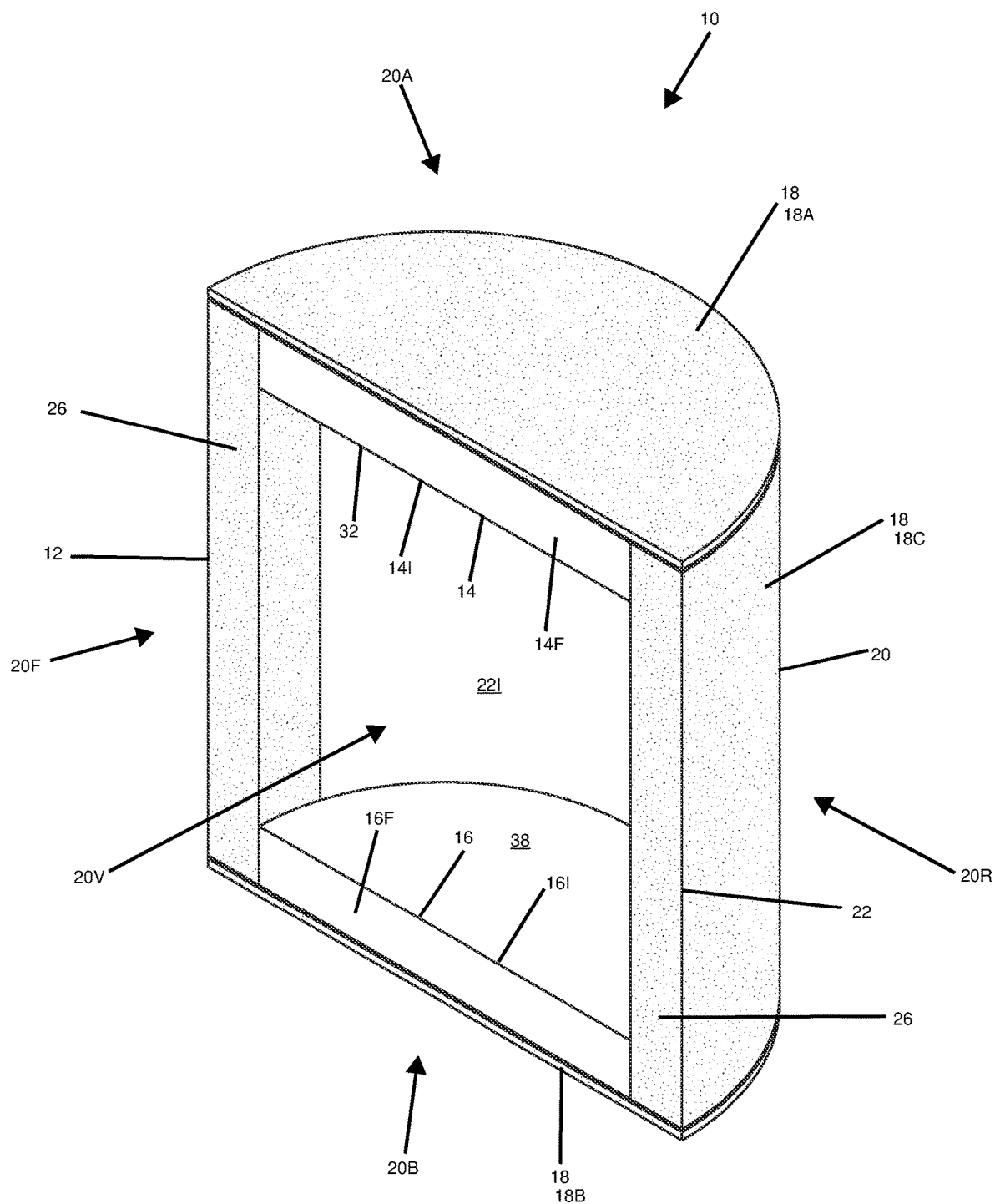
FIG. 1 shows a front perspective view of the geometric art structure according to one embodiment of the present disclosed technology.
Figure 2:
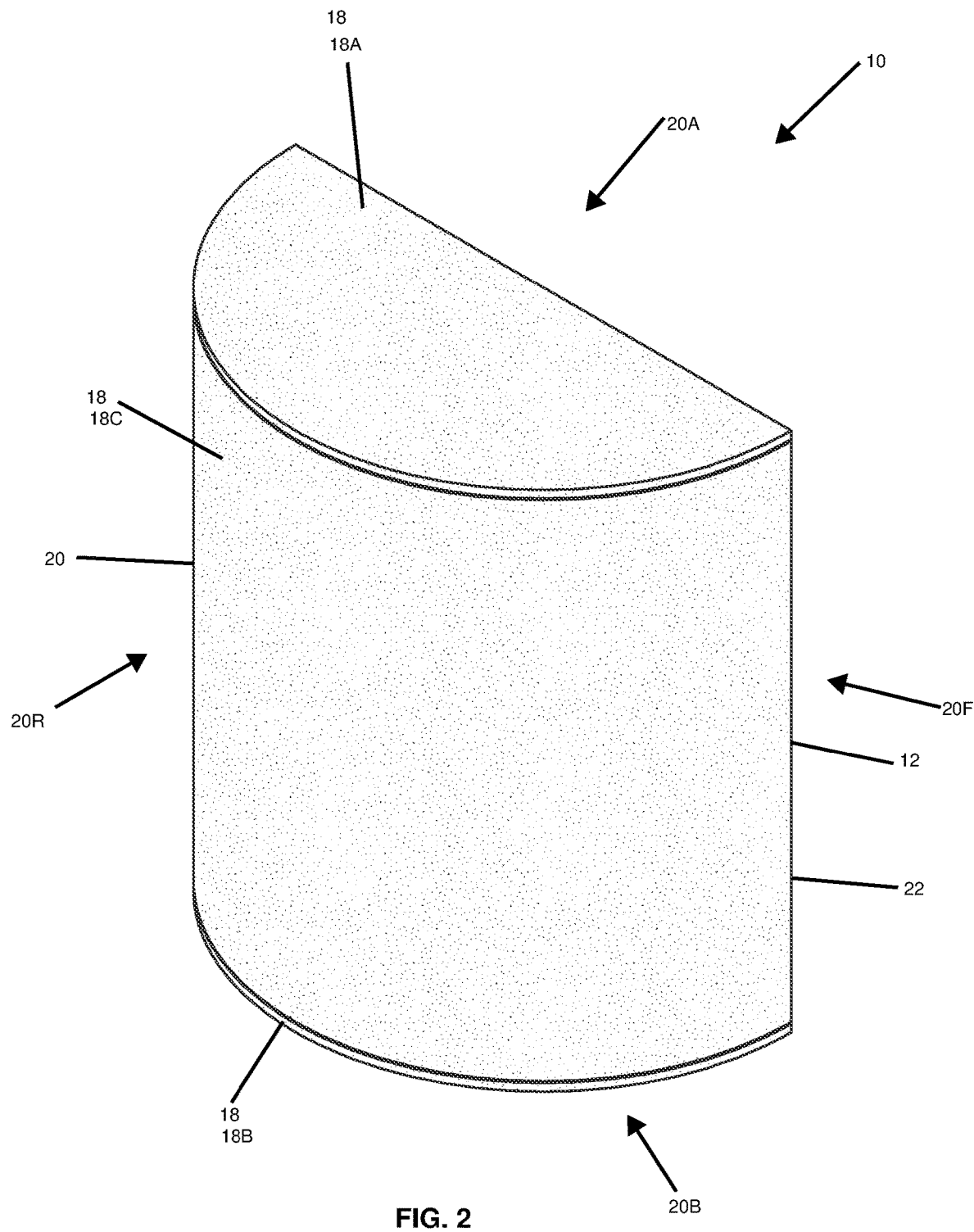
FIG. 2 shows a rear perspective view of the geometric art structure according to one embodiment of the present disclosed technology.
Figure 3:
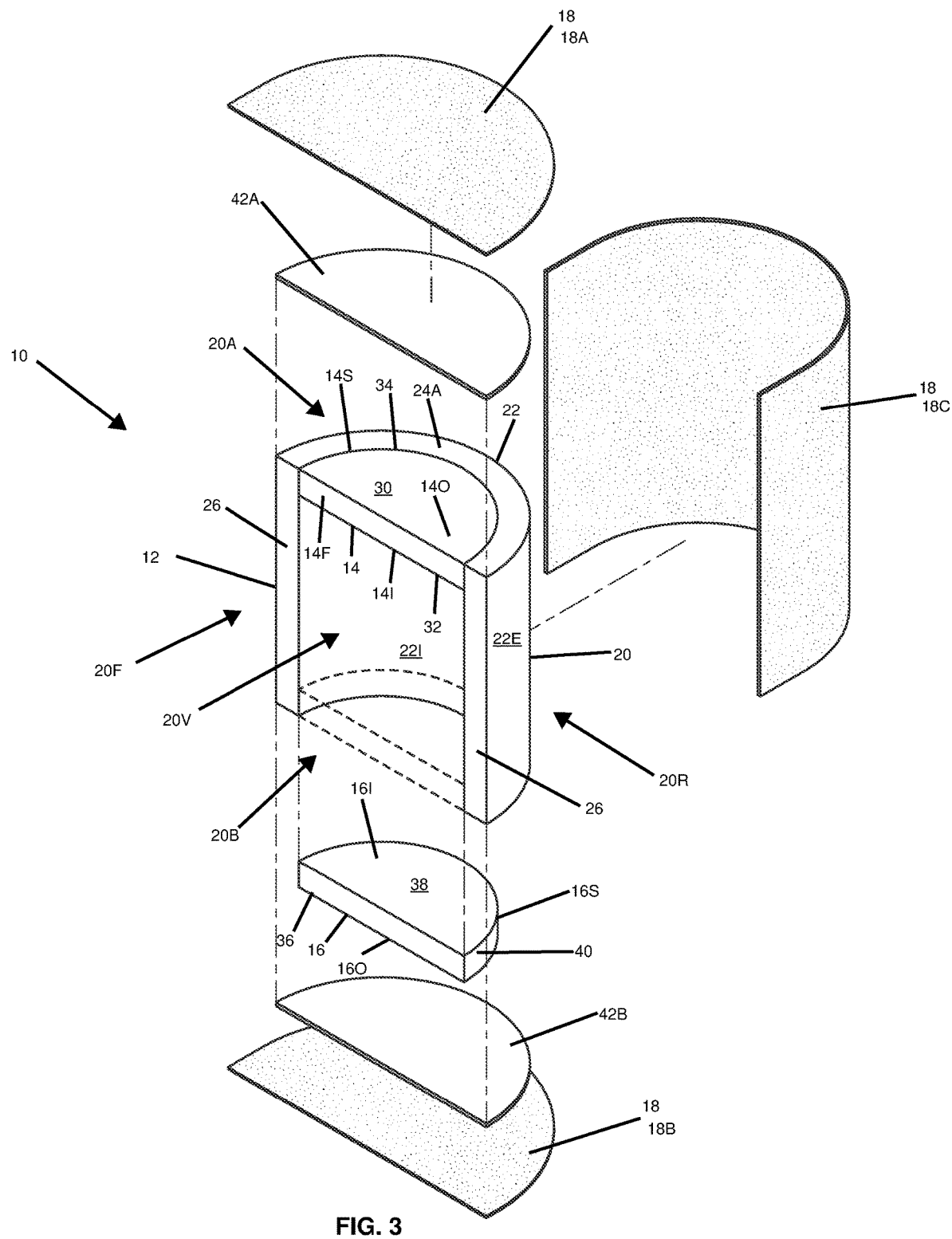
FIG. 3 shows an exploded view of the geometric art structure according to one embodiment of the present disclosed technology.
Figure 4:
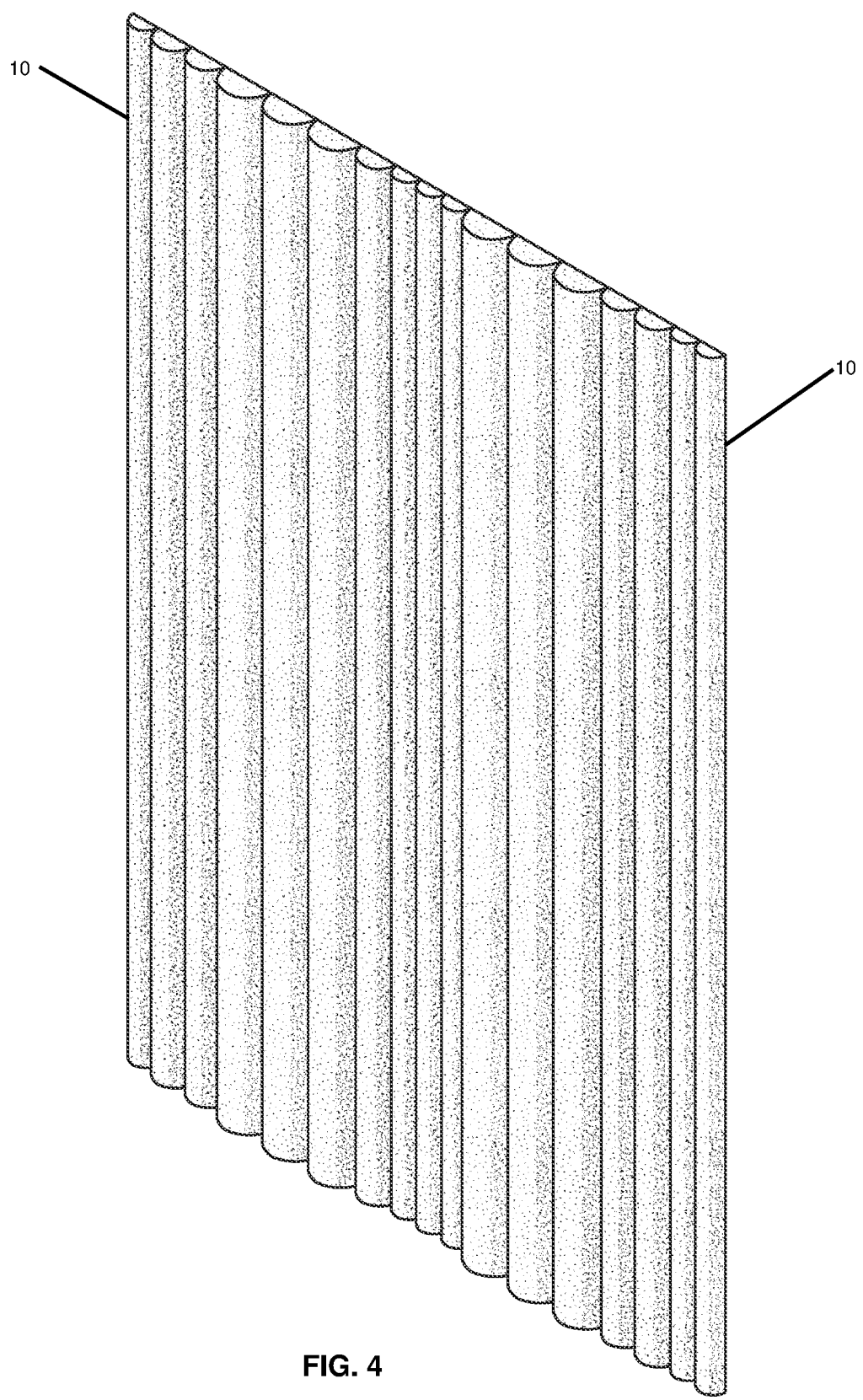
FIG. 4 shows a perspective view of a formed three-dimensional work of art using the geometric art structure according to one embodiment of the present disclosed technology.

Referring now to FIG. 1, FIG. 2, FIG. 3, FIG. 4, simultaneously, FIG. 1 shows a front perspective view of the geometric art structure according to one embodiment of the present disclosed technology. FIG. 2 shows a rear perspective view of the geometric art structure according to one embodiment of the present disclosed technology. FIG. 3 shows an exploded view of the geometric art structure according to one embodiment of the present disclosed technology. FIG. 4 shows a perspective view of a formed three-dimensional work of art using the geometric art structure according to one embodiment of the present disclosed technology. The geometric art structure 10 comprises a half cylinder 12, a first semi-circular panel 14, a second semi-circular panel 16, and a cover 18 extending tautly over the half cylinder 12, the first semi-circular panel 14, and the second semi-circular panel 16.

The half cylinder 12 comprises a semi-circular body 20 defining a semi-circular wall 22 having an interior surface 22I, an exterior surface 22E opposite the interior surface 22I, a first end 20A, a second end 20B opposite the first end 20A, a front end 20F, a closed rear end 20R opposite the front end 20F, and a hollowed semi-circular interior volume 20V. The first end 20A includes a first lateral face 24A extending laterally from the front end 20F to the rear end 20R. The second end 20B includes a second lateral face 24B extending laterally from the front end 20F to the rear end 20R. The front end 20F includes a pair of front longitudinal faces 26 extending longitudinally from the first end 20A to the second end 20B and between the interior surface 22I and exterior surface 22E. The front end 20F includes an opening 28 providing access to the hollowed semi-circular interior volume 20V. In embodiments, the first lateral face 24A, the second lateral face 24B, and the pair of front longitudinal faces 26 each include a planar surface. The pair of front longitudinal faces 26 are coplanar with respect to each other. The first lateral face 24A and the second lateral face 24B are perpendicular with respect to the pair of front longitudinal faces 26.

The first semi-circular panel 14 is disposed at the first end 20A of the semi-circular body 20. The first semi-circular panel 14 is positioned within the first end 20A such that it is flush with the first lateral face 24A and the pair of front longitudinal faces 26. The first semi-circular panel 14 extends between the front end 20F and the rear end 20R of the body 20. The first semi-circular panel 14 comprises an outer end 140 including an outer planar surface 30, an inner end 141 including an inner planar surface 32, the outer end 140 opposite the inner end 141, a sidewall 14S defining an arcuate planar face 34, and a front lateral face 14F extending between the outer end 140 and the inner end 141. The front lateral face 14F includes a front planar surface. The first semi-circular panel 14 is positioned within the hollowed semi-circular interior volume 20V such that the arcuate planar face 34 is positioned against the interior surface 22I of the semi-circular wall 22 at the first end 20A of the body 20. The outer planar surface 30 is flush with the planar surface of the first lateral face 24A. The front planar surface of the front lateral face 14F is flush with the planar surfaces of the pair of longitudinally extending faces 26.

The second semi-circular panel 16 is disposed at the second end 20B of the semi-circular body 20B. The second semi-circular panel 16 is positioned within the second end 20B such that it is flush with the second lateral face 24B and the pair of front longitudinal faces 26. The second semi-circular panel 16 extends between the front end 20F and the rear end 20R of the body 20. The second semi-circular panel 16 is positioned opposite the first semi-circular panel 16.

The second semi-circular panel 16 comprises an outer end 160 including an outer planar surface 36, an inner end 161 including an inner planar surface 38, the outer end 160 opposite the inner end 161, a sidewall 16S defining an arcuate planar face 40, and a front lateral face 16F extending between the outer end 160 and the inner end 161. The front lateral face 16F includes a front planar surface. The second semi-circular panel 16 is positioned within the hollowed semi-circular interior volume 20V such that the arcuate planar face 40 of the sidewall 16S is positioned against the interior surface 22I of the semi-circular wall 22 at the second end 20B of the body 20. The outer planar surface 36 of the second semi-circular panel 16 is flush with the planar surface of the second lateral face 24B and the front planar surface of the front lateral face 16F is flush with the planar surfaces of the pair of longitudinally extending faces 26. In embodiments, the front lateral face 14F of the first semi-circular panel 14, the front lateral face 16F of the second semi-circular panel 16, and the pair of front longitudinal faces 26 are coplanar with respect to one another.

The cover 18 extends tautly over the first end 20A of the body 20 and the first semi-circular panel 14, the second end 20B of the body 20 and the second semi-circular panel 16, and the rear end 20R of the body 20 and the exterior surface 22E of the semi-circular wall 22. The cover 18 extends to the front lateral face 14F of the first semi-circular panel 14, to the front lateral face 16F of the second semi-circular panel 16, and to the pair of front longitudinal faces 26 such that the cover 18 is coplanar with each of the front lateral faces 14F, 16F and the pair of front longitudinal faces 26.

In embodiments, the cover 18 comprises a first piece 18A positioned over the first end 20A of the body 20 and the first semi-circular panel 14, a second piece 18B positioned over the second end 20B of the body 20 and the second semi-circular panel 16, and a third piece 18C positioned over the rear end 20R of the body 20 and the exterior surface 22E of the semi-circular wall 22. The cover 18 extends over the body 20 such that it terminates at the front end 20F, thereby leaving the opening 28 of the front end 20F exposed and leaving access to the hollowed semi-circular interior volume 20V of the body 20.

In some embodiments, the geometric art structure 10 comprises a first intermediary layer 42A positioned between the first piece 18A and the outer planar surface 30 of the first semi-circular panel 14, and a second intermediary layer 42B positioned between the second piece 18B and the outer planar surface 36 of the second semi-circular panel 16. The first intermediary layer 42A is coextensive with first lateral face 24A of the body 20. The second intermediary layer 42B is coextensive with second lateral face 24B of the body 20.

In embodiments of the present disclosed technology, the geometric art structure 10 is made by first attaching, via an adhesive or fastener, the first semi-circular panel 14 to the hollowed semi-circular interior volume 20V at the first end 20A of the body 20 such that the arcuate planar face 34 of the first semi-circular panel 14 is positioned against the interior surface 22I of the semi-circular wall 22 at the first end 20A of the body 20, the outer planar surface 30 of the first semi-circular panel 14 is flush with the planar surface of the first lateral face 24A of the body 20, and the front planar surface of the front lateral face 14F of the first semi-circular panel 14 is flush with the planar surfaces of the pair of longitudinally extending faces 26.

Next, the second semi-circular panel 16 is attached, via an adhesive or fastener, to the hollowed semi-circular interior volume 20V at the second end 20B of the body 20 such that the arcuate planar face 40 of the second semi-circular panel 16 is positioned against the interior surface 22I of the semi-circular wall 22 at the second end 20B of the body 20, the outer planar surface 36 of the second semi-circular panel 16 is flush with the planar surface of the second lateral face 24B of the body, and the front planar surface of the front lateral face 16F of the second semi-circular panel 16 is flush with the planar surfaces of the pair of longitudinally extending faces 26.

Then, the cover 18 is extended tautly over the first end 20A of the body 20 and the first semi-circular panel 14 to the front end 20F of the body 20 and front lateral face 14F of the first semi-circular panel 14 such that it is coextensive with first lateral face 24A and coplanar with the front lateral face 14F and the pair of front longitudinal faces 26. Lastly, the cover 18 is extended tautly over the second end 20B of the body 20 and the second semi-circular panel 16 to the front end 20F of the body 20 and front lateral face 16F of the second semi-circular panel 16 such that it is coextensive with second lateral face 24B and coplanar with the front lateral face 16F and the pair of front longitudinal faces 26.

Figure 5:
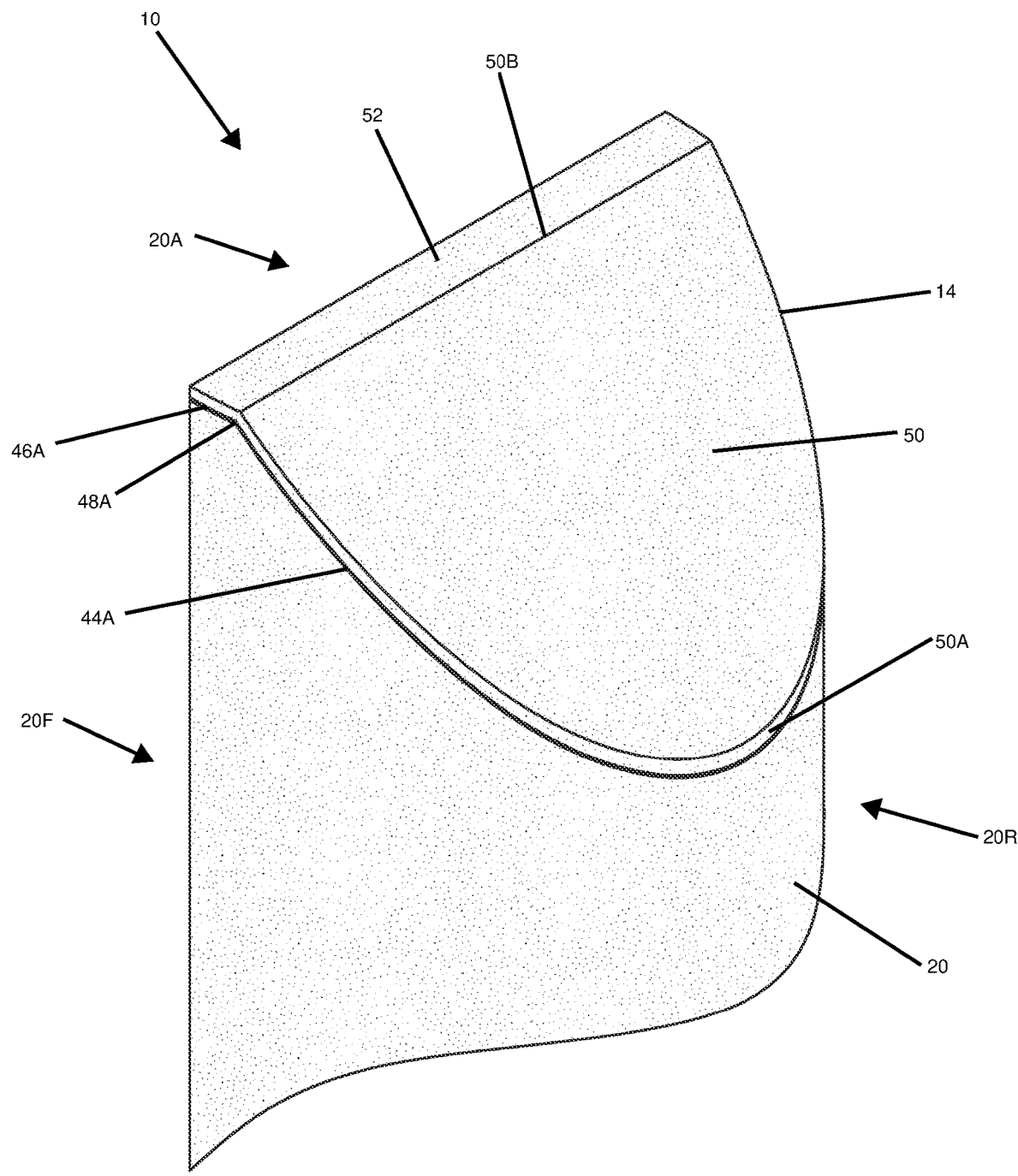
FIG. 5 shows a front perspective view of the first end of the geometric art structure according to another embodiment of the present disclosed technology.
Figure 6:
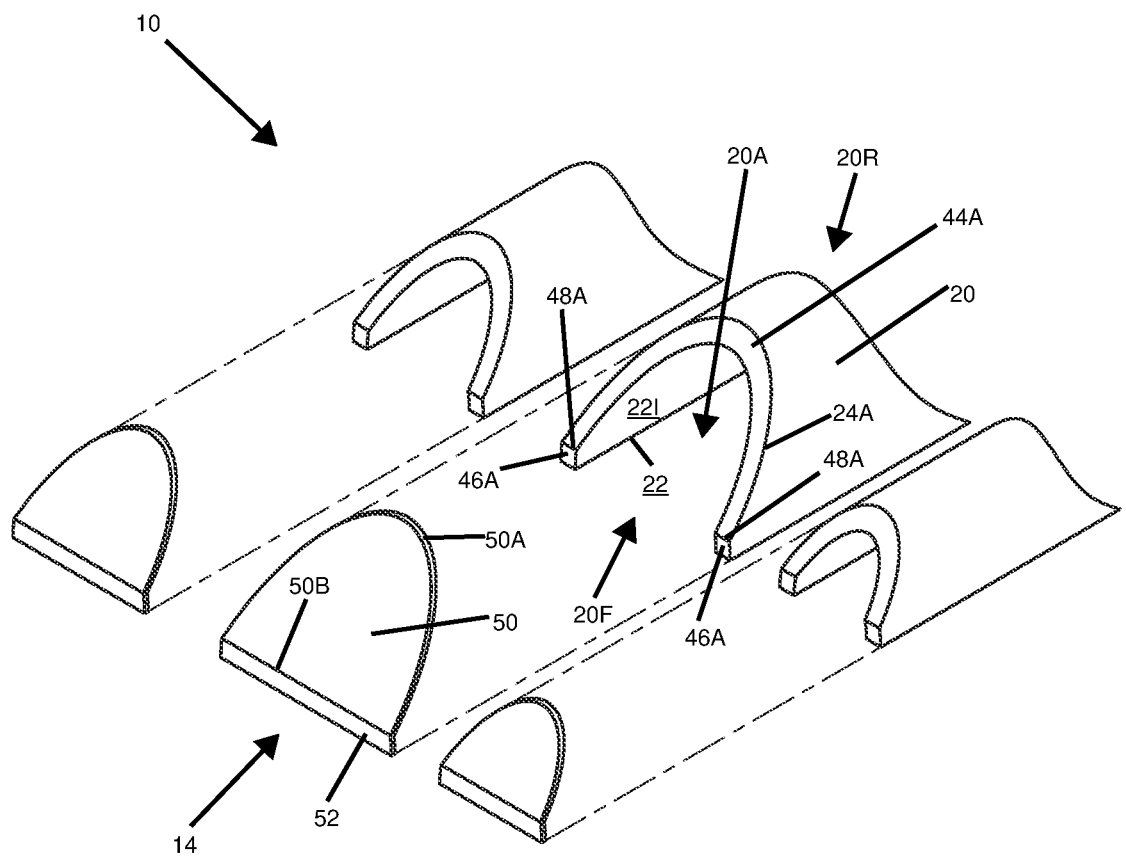
FIG. 6 shows a top exploded view of the first end of the geometric art structure according to another embodiment of the present disclosed technology.
Figure 7:
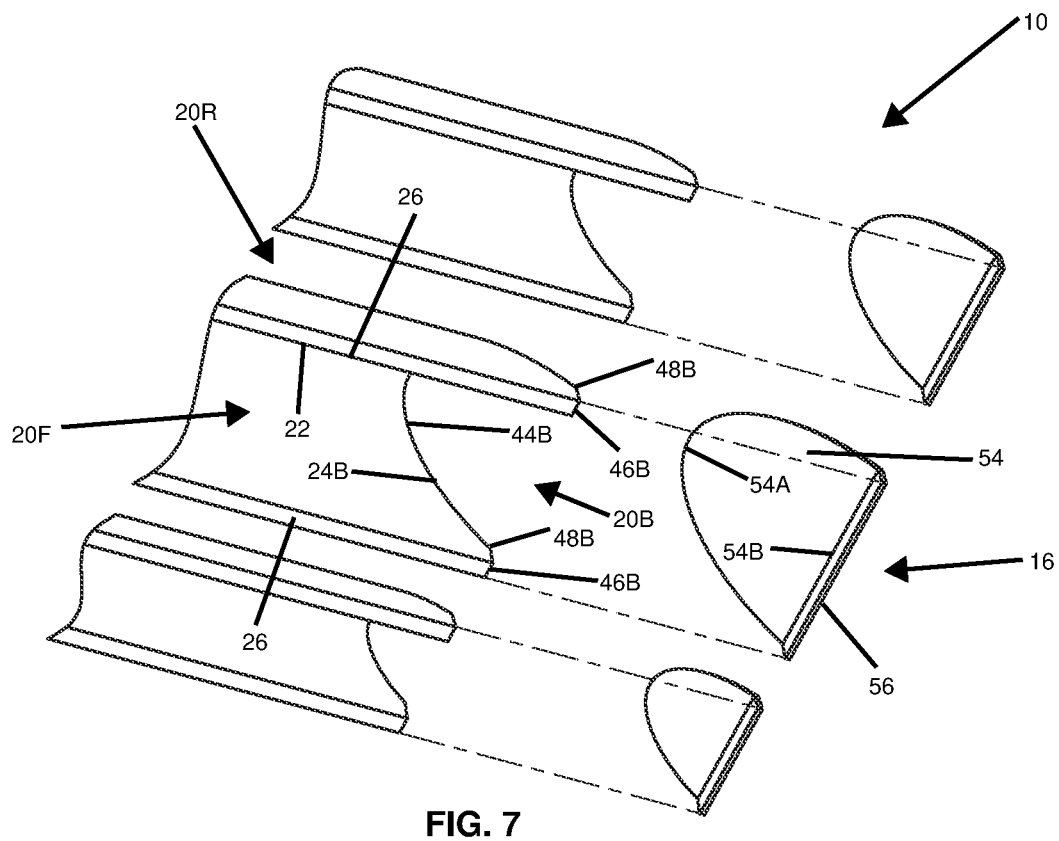
FIG. 7 shows a bottom exploded view of the second end of the geometric art structure according to another embodiment of the present disclosed technology.
Figure 8:
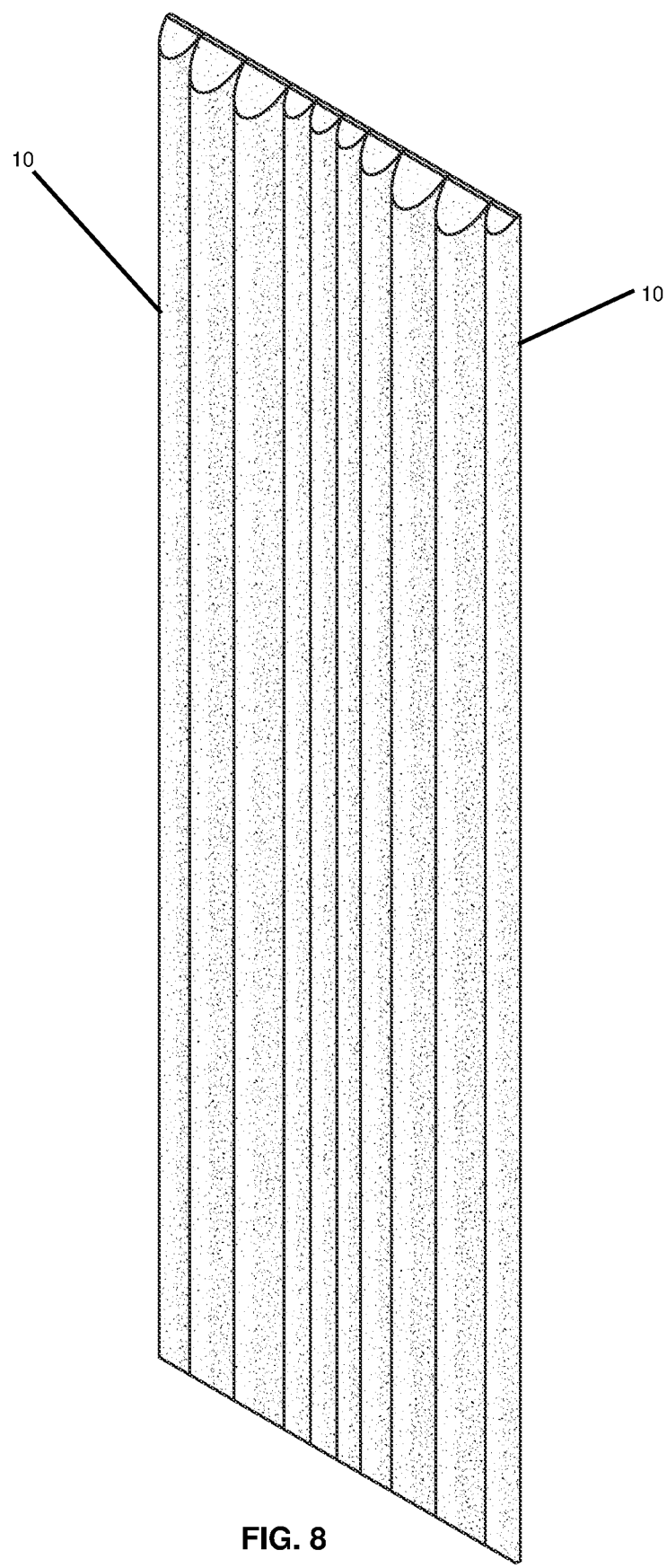
FIG. 8 shows a perspective view of a formed three-dimensional work of art using the geometric art structure according to another embodiment of the present disclosed technology.

Referring now to FIG. 5, FIG. 6, FIG. 7, and FIG. 8, simultaneously, FIG. 5 shows a front perspective view of the first end of the geometric art structure according to another embodiment of the present disclosed technology. FIG. 6 shows a top exploded view of the first end of the geometric art structure according to another embodiment of the present disclosed technology. FIG. 7 shows a bottom exploded view of the second end of the geometric art structure according to another embodiment of the present disclosed technology. FIG. 8 shows a perspective view of a formed three-dimensional work of art using the geometric art structure according to another embodiment of the present disclosed technology. In embodiments, the first lateral face 24A includes a first sloping portion 44A extending at an angle from the front end 20F of the body 20 to the rear end 20R of the body 20 such that the body 20 is longer at the front end 20F than at the rear end 20R. The first sloping portion 44A includes a planar surface. The first lateral face 24A includes a first shoulder 46A adjacent to the front end 20F of the body 20. The first shoulder 46A includes a planar surface that is disposed at an angle with respect to the first sloping portion 44A. The first sloping portion 44A extends vertically away from the rear end 20R to the first shoulder 46A. The first sloping portion extends from the rear end 20R at an obtuse angle with respect to the interior surface 22I of the semi-circular wall 22. The first lateral face 24A forms a first ridge 48A at the juncture between the first sloping portion 44A and the first shoulder 46A.

In embodiments, the second lateral face 24B includes a second sloping portion 44B extending at an angle from the front end 20F to the rear end 20R such that the body 20 is longer at the front end 20F than at the rear end 20R. The second sloping portion 44B includes a planar surface. The second lateral face 24B includes a second shoulder 46B adjacent to the front end 20F. The second shoulder 46B includes a planar surface that is disposed at an angle with respect to the second sloping portion 44B. The second sloping portion 44B extends vertically away from the rear end 20R to the second shoulder 46B. The second sloping portion 44B extends from the rear end 20R at an obtuse angle with respect to the interior surface 22I of the semi-circular wall 22. The second lateral face 24B forms a second ridge 48B at the juncture between the second sloping portion 44B and the second shoulder 46B. In some embodiments, the planar surface of the first shoulder 46A and the planar surface of the second shoulder 46B are orthogonal relative to the planar surfaces of the pair of front longitudinal faces 26 of the body 20.

In embodiments, the first semi-circular panel 14 comprises a planar body 50 including substantially the shape as the first lateral face 24A. The planar body 50 includes a curved end 50A and a flat end 50B including a first lip 52 protruding outwardly therefrom. The first lip 52 protrudes at an angle with respect to the planar body 50. The first semi-circular panel 14 is positioned on the first end 20A of the body 20 such that the planar body 50 of the first semi-circular panel 14 conforms to the contour formed by the first lateral face 24A and is coextensive therewith.

The second semi-circular panel 16 comprises a planar body 54 including substantially the shape as the second lateral face 24B. The planar body 54 includes a curved end 54A and a flat end 54B including a second lip 56 protruding outwardly therefrom. The second lip 56 protrudes at an angle with respect to the planar body 54. The second semi-circular panel 16 is positioned on the second end 20B of the body 20 such that the planar body 54 of the second semi-circular panel 16 conforms to the contour formed by the second lateral face 24B and is coextensive therewith.

In embodiments of the present disclosed technology, the geometric art structure 10 is made by first attaching, via an adhesive or fastener, the first semi-circular panel 14 to the first lateral face 24A such that first lip 52 is positioned on the first shoulder 46A and the planar body 50 of the first semi-circular panel 14 is positioned on the first sloping region 44A. In this way, the first semi-circular panel 16 conforms to the contour formed by the second lateral face 24B and is coextensive therewith.

Next, the second semi-circular panel 16 is attached to the second lateral face 24B such that second lip 56 is positioned on the second shoulder 46B and the planar body 54 of the second semi-circular panel 16 is positioned on the second sloping region 44B. In this way, the first semi-circular panel 14 conforms to the contour formed by the first lateral face 24A and is coextensive therewith.

Then, the cover 18 is extended tautly over the first end 20A of the body 20 and over the planar body 50 of the first semi-circular panel 14 to the front end 20F of the body 20 such that it is coextensive with first lateral face 24A and coplanar with the pair of front longitudinal faces 26. Lastly, the cover 18 is extended tautly over the second end 20B of the body 20 and over the planar body 54 of the second semi-circular panel 16 to the front end 20F of the body 20 such that it is coextensive with second lateral face 24B and coplanar with the pair of front longitudinal faces 26.

Any device or step to a method described in this disclosure can comprise or consist of that which it is a part of, or the parts which make up the device or step. The term "and/or" is inclusive of the items which it joins linguistically and each item by itself.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

What is claimed is:

1. A geometric art structure for forming three-dimensional artwork, comprising:
   a half cylinder including a semi-circular body defining a semi-circular wall having an interior surface, an exterior surface, the interior surface opposite the exterior surface, a first end, a second end, the first end opposite the second end, a front end, a closed rear end, the front end opposite the rear end, and a hollowed semi-circular interior volume, the first end including a first lateral face extending laterally from the front end to the rear end, the second end including a second lateral face extending laterally from the front end to the rear end, the front end including a pair of front longitudinal faces extending longitudinally from the first end to the second end and between the interior surface and exterior surface, the front end including an opening providing access to the hollowed semi-circular interior volume;
   a first semi-circular panel disposed at the first end, the first semi-circular panel flush with the first lateral face and the pair of front longitudinal faces, the first semi-circular panel extending between the front end and the rear end;
   a second semi-circular panel disposed at the second end, the second semi-circular panel flush with the second lateral face and the pair of front longitudinal faces, the second semi-circular panel extending between the front end and the rear end, the second semi-circular panel opposite the first semi-circular panel; and
   a cover extending tautly over the first end and the first semi-circular panel, the second end and the second semi-circular panel, and the rear end and the exterior surface.

2. The geometric art structure of claim 1, wherein the first lateral face, the second lateral face, and the pair of front longitudinal faces each include a planar surface.

3. The geometric art structure of claim 2, wherein the pair of front longitudinal faces are coplanar with respect to each other.

4. The geometric art structure of claim 3, wherein:
   the first semi-circular panel comprises an outer end including an outer planar surface, an inner end including an inner planar surface, the outer end opposite the inner end, a sidewall defining an arcuate planar face, and a front lateral face extending between the outer end and the inner end, the front lateral face including a front planar surface; and
   the second semi-circular panel comprises an outer end including an outer planar surface, an inner end including an inner planar surface, the outer end opposite the inner end, a sidewall defining an arcuate planar face, and a front lateral face extending between the outer end and the inner end, the front lateral face including a front planar surface.

5. The geometric art structure of claim 4, wherein:
   the first semi-circular panel is positioned within the hollowed semi-circular interior volume such that the arcuate planar face of the sidewall is against the interior surface, the outer planar surface is flush with the planar surface of the first lateral face, and the front planar surface of the front lateral face is flush with the planar surfaces of the pair of longitudinally extending faces; and
   the second semi-circular panel is positioned within the hollowed semi-circular interior volume such that the arcuate planar face of the sidewall of the second semi-circular panel is against the interior surface, the outer planar surface of the second semi-circular panel is flush with the planar surface of the second lateral face and the front planar surface of the front lateral face of the second semi-circular panel is flush with the planar surfaces of the pair of longitudinally extending faces.

6. The geometric art structure of claim 5, wherein the first lateral face and the second lateral face are perpendicular with respect to the pair of front longitudinal faces.

7. The geometric art structure of claim 6, wherein the front lateral face of the first semi-circular panel, the front lateral face of the second semi-circular panel, and the pair of front longitudinal faces are coplanar with respect to one another.

8. The geometric art structure of claim 7, wherein the cover extends to the front lateral face of the first semi-circular panel, the front lateral face of the second semi-circular panel, and the pair of front longitudinal faces such that the cover is coplanar with each of the front lateral faces and the pair of front longitudinal faces.

9. The geometric art structure of claim 8, wherein the cover comprises:
   a first piece positioned over the first end and the first semi-circular panel;
   a second piece positioned over the second end and the second semi-circular panel; and
   a third piece positioned over the rear end and exterior surface of the semi-circular wall.

10. The geometric art structure of claim 9, further comprising:
    a first intermediary layer positioned between the first piece and the outer planar surface of the first semi-circular panel; and
    a second intermediary layer positioned between the second piece and the outer planar surface of the second semi-circular panel.

11. The geometric art structure of claim 10, wherein the cover extends over the semi-circular body such that it terminates at the front end, thereby leaving the opening of the front end exposed and leaving access to the hollowed semi-circular interior volume.

12. The geometric art structure of claim 3, wherein:
    the first lateral face including a first sloping portion extending at an angle from the front end to the rear end such that the body is longer at the front end than at the rear end, the first sloping portion including a planar surface; and
    the second lateral face including a second sloping portion extending at an angle from the front end to the rear end such that the body is longer at the front end than at the rear end, the second sloping portion including a planar surface.

13. The geometric art structure of claim 12, wherein:
    the first lateral face includes a first shoulder adjacent to the front end, the first shoulder having a planar surface, the first sloping portion extending vertically away from the rear end to the first shoulder, the first lateral face forming a first ridge at the juncture between the first sloping portion and the first shoulder; and
    the second lateral face includes a second shoulder adjacent to the front end, the second shoulder having a planar surface, the second sloping portion extending vertically away from the rear end to the second shoulder, the second lateral face forming a second ridge at the juncture between the second sloping portion and the second shoulder.

14. The geometric art structure of claim 13, wherein:

the first sloping portion extends from the rear end at an obtuse angle with respect to the interior surface of the semi-circular wall; and the second sloping portion extends from the rear end at an obtuse angle with respect to the interior surface of the semi-circular wall.

15. The geometric art structure of claim 14, wherein:

the planar surface of the first shoulder and the planar surface of the second shoulder are orthogonal relative to the planar surfaces of the pair of front longitudinal faces;

the planar surface of the first shoulder is disposed at an angle with respect to the first sloping portion; and the planar surface of the second shoulder is disposed at an angle with respect to the second sloping portion.

16. The geometric art structure of claim 15, wherein:

the first semi-circular panel comprises a planar body including substantially the shape as the first lateral face, the planar body including a curved end and a flat end including a first lip protruding outwardly therefrom, the first lip protruding at an angle with respect to the planar body; and the second semi-circular panel comprises a planar body including substantially the shape as the second lateral face, the planar body including a curved end and a flat end including a second lip protruding outwardly therefrom, the second lip protruding at an angle with respect to the planar body.

17. The geometric art structure of claim 16, wherein:

the first semi-circular panel is positioned on the first end such that the planar body conforms to the contour formed by the first lateral face and is coextensive therewith; and the second semi-circular panel is positioned on the second end such that the planar body of the second semi-circular panel conforms to the contour formed by the second lateral face and is coextensive therewith.

18. The geometric art structure of claim 17, wherein cover extends over the semi-circular body such that it terminates at the front end, thereby leaving the opening of the front end exposed and leaving access to the hollowed semi-circular interior.

* * * * *